Dec. 25, 1956     H. L. CROWTHER     2,774,983
SCOURING PAD HOLDER
Filed Feb. 25, 1955
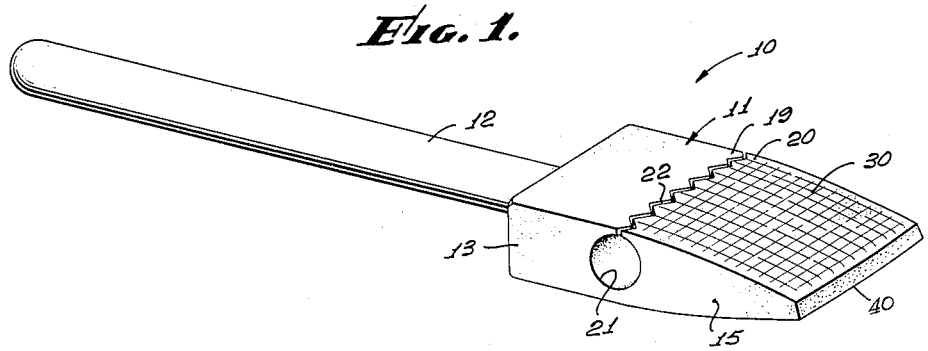
FIG. 1.
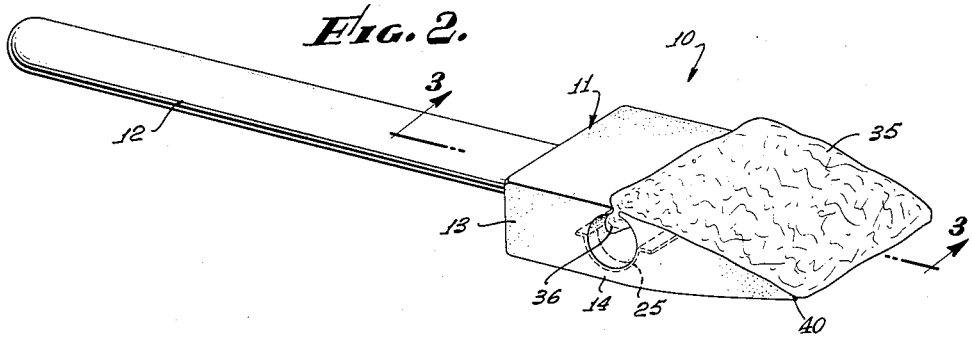
FIG. 2.
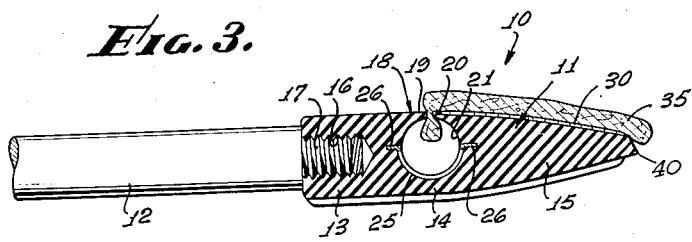
FIG. 3.
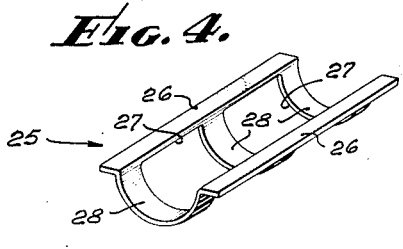
FIG. 4.
H. L. CROWTHER,
INVENTOR.
BY 
ATTORNEY.

United States Patent Office 2,774,983
Patented Dec. 25, 1956

2,774,983

SCOURING PAD HOLDER

Hearl L. Crowther, San Leandro, Calif.

Application February 25, 1955, Serial No. 490,454

4 Claims. (Cl. 15—209)

This invention relates to kitchen utensils and particularly to holders for scouring pads.

Scouring pads which are generally formed of steel wool and which are sometimes impregnated with a detergent are in common use in kitchens for scouring pots and pans to remove food which has been burned onto these. The practice is to apply these pads by hand to the pots and pans to be scoured. While this gets results, the steel wool in the pad breaks up and the ends of the steel fibers tend to abrade and sometimes puncture the skin of the hands.

While several different types of devices have been provided for the holding of scouring pads when applying the same to cleaning pots and pans and to protect the hands from the steel wool of the scouring pad, these have either been lacking in means for adapting the scouring pad to the corners and other difficult contours requiring to be cleaned or they required the hand employed in the operation to be submerged in dishwater during the scouring operation. Furthermore, scouring pad holders previously offered which were flexible depended upon the grip with which the holder was held in the hand of the user for retaining the pad in assembled relation with the holder.

It is an object of the present invention to provide a scouring pad holder which holds a pad securely and yet has a thin flexible wedge-like extremity by which the pad is caused to conform to the varying concave contours of the inside of a pot and which may also be used as a squeegee for removing excess food from the pot prior to the scouring operation and which will have a thick base end for mounting the holder on the handle which will permit the holder to be manipulated in a pan containing dishwater without the necessity of the hand using the holder being submerged in said water.

Still another object of the invention is to provide such a scouring pad holder in which the pad gripping means comprises a transverse opening in said body with gripping jaws molded in said rubber at the mouth of said opening and with said body reinforced by a metal spring imbedded in said rubber body to cause said gripping means to remain in gripping relation with the scouring pad while said rubber body is being manipulated in the application of said scouring pad in a scouring operation.

Another object of the invention is to provide a scouring pad holder which may be used as a squeegee for scraping food from dishes and pots and pans when it is not being used as a scouring pad holder.

The manner of accomplishing the foregoing objects as well as further objects and advantages will be made manifest in the following description taken in connection with the accompanying drawings in which:

Fig. 1 is a perspective view of a preferred embodiment of the invention prior to the attachment of a scouring pad thereto.

Fig. 2 is a view similar to Fig. 1 and showing the invention with a scouring pad applied to the holder and having one edge of the scouring pad held in the gripping means of the holder.

Fig. 3 is a longitudinal sectional view of the scouring pad holder with the scouring pad in place, said view being taken on the line 3—3 of Fig. 2.

Fig. 4 is a perspective view of the reinforcing spring of the invention.

Referring specifically to the drawings, the invention is there shown as embodied in a scouring pad holder 10 which includes a rubber body 11, constituting the head thereof, and a handle 12. The rubber body 11 is preferably of molded construction and is of a relatively soft rubber of approximately thirty durometer hardness. The body 11 is cuneiform and is adapted to serve as a squeegee when not being used as a scouring pad holder. The rubber body 11 may thus be said to have a base portion 13, a middle portion 14 and a tapered pad backing portion 15.

The base portion 13 of the rubber body 11 is molded to provide an internally threaded socket 16 into which a threaded end 17 of handle 12 may be screwed in assembling the rubber body 11 on the handle 12.

Formed in the middle portion 14 of the rubber body 11 is a gripping means 18 including jaws 19 and 20 which are produced by forming a hole 21 transversely through the rubber body 11 and forming a serrated opening 22 which divides the portion of the rubber body 11 which lies above the hole 21.

Imbedded in the rubber of the middle portion 14 of the rubber body 11 is a reinforcing spring 25 having anchor flanges 26 and openings 27 which divide the spring 25 into a series of arcuate semi-circular springs 28 which are connected by the anchor flanges 26.

The action of the reinforcing spring 25 is to stiffen the resistance of the rubber body 11 to the separation of the jaws 19 and 20 of the pad gripping means 18, while not impairing the resilience of the tapered squeegee portion 15 of the rubber body.

The upper face 30 of the squeegee portion 15 of the device is formed with a rough configuration as shown in Figs. 1 and 3 for preventing the slipping of a scouring pad from its proper relation overlying face 30 when the holder 10 is being used to apply said pad in a scouring operation.

The preferred manner of applying a scouring pad 35 to the pad holder 10 is to hold the pad 35 in one hand while holding the pad holder 10 in the other hand by gripping the squeegee portion 15 thereof. With the holder thus held, it is moved to place the handle 12 against the body, of the person performing the operation, and with the base portion 13 of the head of the holder thus held against rotation about the axis of the hole 21, the squeegee portion 15 of the head is rotated about said axis by the same hand to separate the pad gripping jaws 19 and 20. While the head 11 of the holder is thus flexed to open said jaws, an edge portion 36 of the scouring pad 35, held in the other hand, is inserted between said jaws whereupon the pressure applied to the rubber head 11 is relaxed, allowing the jaws 19 and 20 to come together in gripping relation with the edge portion 36 of the pad 35.

The pad 35 is then bent outwardly against the face 30 as shown in Fig. 3 and the holder 10 is ready for a scouring operation. This is preferably accomplished by the operator manipulating the handle 12 and it is unnecessary to place the hand directly on the pad 35 during the scouring operation. The roughening of the hands or injury thereof by direct contact with the scouring pad 35 is thus completely avoided by the use of this invention.

The uniform support given the pad 35 by the portion 15 of the pad holder, while yielding to permit the pad to conform to the pan being scoured, results also in obtaining a much longer use of a scouring pad then is possible when applying the same directly by hand.

When a scouring pad 35 has been used to the point where it has lost its usefulness, it may be removed by distorting the rubber body 11 to open the jaws 19 and 20 whereupon the old pad is removed and a new pad inserted in its place.

In preparing pots and pans for the scouring operation the pad holder 10 performs excellent service as a squeegee in scraping the food therefrom.

The use of the pad holder 10 as a squeegee is facilitated by providing the tip of the same with a sharp bevelled edge 40.

The claims are:

1. In a scouring pad holder, the combination of: a body of rubber forming a resilient backing for a scouring pad; gripping means formed by the provision of a hole extending transversely through said rubber body close to the upper surface thereof with a slot communicating through said surface of said body with said hole throughout the length of the latter; jaws provided by opposite edges of said slot to grip a scouring pad extended between said jaws when said rubber body is relaxed after having been flexed to separate said jaws, whereby the tendency of said rubber body to return to its normal condition causes said jaws to grip said scouring pad; and a reinforcing spring embedded in said rubber body, said spring yieldably resisting the separation of said jaws and enhancing the clamping action of said jaws on a scouring pad clamped therebetween thereby preventing accidental removal of said pad from said gripping means.

2. A combination as in claim 1 in which said reinforcing spring is confined to the area closely adjacent said transverse hole so as to reinforce said gripping means without impairing the flexibility of the balance of said rubber body which forms a backing for said scouring pad when the latter is applied in a scouring operation.

3. In a scouring pad holder, the combination of: a head comprising a wedge-shaped body of rubber which is relatively thick at its base end and tapers to a relatively thin squeegee edge at its opposite end; a relatively rigid handle connecting with the base end of said head and lying substantially in the same plane as and axially aligned with the head; and gripping means formed on said head by a hole extending transversely through said head near the base end thereof, said hole lying closer to one face of said head than to the opposite face, there being a slot separating the rubber of said head along a line coextensive with said hole between said hole and said closer face of said head, said gripping means including jaws formed by the rubber of said head on opposite edges of said slot, said handle being operative for holding the base end portion of said head against rotation about the axis of said hole while the squeegee end portion of said head is rotated about said axis to open said jaws for the insertion of a scouring pad therebetween, said handle also being operative after said pad is so inserted to manipulate said head to apply said pad in a scouring operation.

4. A combination as in claim 3 in which a relatively stiff but resilient reinforcing means is embedded in the rubber of said head between said opening and said opposite face of said head to enhance the gripping action of said jaws.

References Cited in the file of this patent

UNITED STATES PATENTS

| | | |
|---|---|---|
| 1,899,552 | Bookman | Feb. 28, 1933 |
| 1,958,408 | Jelliffe et al. | May 15, 1934 |
| 2,244,699 | Hosey | June 10, 1941 |